United States Patent [19]

(12) United States Patent
Suzuki

(10) Patent No.: US 10,817,216 B2
(45) Date of Patent: Oct. 27, 2020

(54) ELECTRONIC APPARATUS, NONTRANSITORY STORAGE MEDIUM STORING PROGRAM, AND SHEET CONVEYING APPARATUS

(71) Applicant: Brother Kogyo Kabushiki Kaisha, Nagoya-shi, Aichi-ken (JP)

(72) Inventor: Nobuhiko Suzuki, Toyokawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 302 days.

(21) Appl. No.: 15/939,614

(22) Filed: Mar. 29, 2018

(65) Prior Publication Data

US 2018/0285023 A1    Oct. 4, 2018

(30) Foreign Application Priority Data

Mar. 31, 2017    (JP) .................................. 2017-069926

(51) Int. Cl.
*G06F 3/06* (2006.01)
*G05B 15/02* (2006.01)
*G05D 23/19* (2006.01)

(52) U.S. Cl.
CPC .......... *G06F 3/0659* (2013.01); *G05B 15/02* (2013.01); *G05D 23/1917* (2013.01); *G06F 3/0616* (2013.01); *G06F 3/0619* (2013.01); *G06F 3/0653* (2013.01); *G06F 3/0679* (2013.01)

(58) Field of Classification Search
CPC .. G05B 15/02; G05D 23/1917; G06F 3/0616; G06F 3/0619; G06F 3/0653; G06F 3/0659; G06F 3/0679

USPC ............................ 702/130; 318/362; 347/17
See application file for complete search history.

(56) References Cited

U.S. PATENT DOCUMENTS

| 9,132,670 B2 * | 9/2015 | Ishizuka .............. B41J 11/0095 |
| 10,025,239 B2 * | 7/2018 | Kato .................. H04N 1/00904 |
| 2016/0211780 A1 | 7/2016 | Ito |

FOREIGN PATENT DOCUMENTS

| JP | 5444842 B2 | 3/2014 |
| JP | 2015-125434 A | 7/2015 |
| JP | 2016-134642 A | 7/2016 |

* cited by examiner

*Primary Examiner* — John H Le
(74) *Attorney, Agent, or Firm* — Banner & Witcoff, Ltd.

(57) ABSTRACT

An electronic apparatus includes a motor, a controller, and a nonvolatile memory. The controller executes: an estimated-value calculating process for calculating an estimated value of a temperature of the motor; a first writing process for writing the calculated estimated value into the nonvolatile memory in a situation in which the calculated estimated value increases; and a second writing process for writing the calculated estimated value into the nonvolatile memory in a situation in which the calculated estimated value decreases. The controller executes the first writing process when at least a first time has elapsed after the estimated value is written in the nonvolatile memory. The controller executes the second writing process when at least a second time has elapsed after the estimated value is written in the nonvolatile memory. The first time is less than the second time.

15 Claims, 4 Drawing Sheets ary, a nontransitory storage medium storing a program readable by a computer of the electronic apparatus, and a sheet conveying apparatus.

There is known a technique for estimating a temperature of a motor and controlling the temperature of the motor in an automatic document feeder (ADF) included in an image reading apparatus. In the above-described technique, the estimated temperature of the motor is stored into a nonvolatile memory, to prevent the chance of loss of information for estimating the temperature of the motor due to an unexpected power failure.

In the above technique, temperature information is written into the nonvolatile memory when an estimated amount of change in the temperature of the motor (hereinafter may be referred to as "temperature change amount") is greater than or equal to a predetermined amount, and the temperature information is not written into the nonvolatile memory when the temperature change amount is less than the predetermined amount. This configuration reduces the frequency of writing into the nonvolatile memory, and a lifetime of the nonvolatile memory is prolonged when compared with a device that writes the temperature information into the nonvolatile memory at constant intervals irrespective of the temperature change amount.

SUMMARY

Even in an apparatus configured to write the temperature information into the nonvolatile memory when the temperature change amount is greater than or equal to the predetermined amount, however, writing into the nonvolatile memory occurs frequently when the temperature change amount becomes greater than or equal to the predetermined amount many times in a short time. This shortens the lifetime of the nonvolatile memory even in the known technique.

The present disclosure is to provide an electronic apparatus, a nontransitory storage medium storing a program readable by a computer of the electronic apparatus, and a sheet conveying apparatus configured to use a method different from conventional ones to reduce occurrences of excessively high frequency with which an estimated value of a temperature of a motor is written into a nonvolatile memory.

In one aspect of the disclosure, an electronic apparatus includes: a motor; a controller configured to control the motor; and a nonvolatile memory configured to store data to be read and written by the controller. The controller is configured to execute: an estimated-value calculating process in which the controller calculates an estimated value of a temperature of the motor, such that the estimated value increases based on a driving amount and a driving condition of the motor, and decreases with a lapse of time; a first writing process in which the controller writes the estimated value calculated in the estimated-value calculating process, into the nonvolatile memory in a situation in which the estimated value calculated in the estimated-value calculating process increases; and a second writing process in which the controller writes the estimated value calculated in the estimated-value calculating process, into the nonvolatile memory in a situation in which the estimated value calculated in the estimated-value calculating process decreases. The controller is configured to: execute the first writing process when at least a first time has elapsed after the estimated value is written in the nonvolatile memory; and execute the second writing process when at least a second time has elapsed after the estimated value is written in the nonvolatile memory. The first time is less than the second time.

In another aspect of the disclosure, a nontransitory storage medium stores a program readable by a computer of an electronic apparatus. The electronic apparatus includes a motor and a nonvolatile memory configured to store data to be read and written. When executed by the computer, the program causes the electronic apparatus to execute: an estimated-value calculating process in which the electronic apparatus calculates an estimated value of a temperature of the motor, such that the estimated value increases based on a driving amount and a driving condition of the motor, and decreases with a lapse of time; a first writing process in which the electronic apparatus writes the estimated value calculated in the estimated-value calculating process, into the nonvolatile memory in a situation in which the estimated value calculated in the estimated-value calculating process increases, and a second writing process in which the electronic apparatus writes the estimated value calculated in the estimated-value calculating process, into the nonvolatile memory in a situation in which the estimated value calculated in the estimated-value calculating process decreases. The first writing process is executed when at least a first time has elapsed after the estimated value is written in the nonvolatile memory. The second writing process is executed when at least a second time has elapsed after the estimated value is written in the nonvolatile memory. The first time is less than the second time.

In still another aspect of the disclosure, a sheet conveying apparatus includes: a motor; a conveyor configured to be driven by the motor and convey a sheet along a particular conveyance path; a controller configured to control the motor; and a nonvolatile memory configured to store data to be read and written by the controller. The controller is configured to execute: an estimated-value calculating process in which the controller calculates an estimated value of a temperature of the motor, such that the estimated value increases based on a driving amount and a driving condition of the motor, and decreases with a lapse of time; a first writing process in which the controller writes the estimated value calculated in the estimated-value calculating process, into the nonvolatile memory in a situation in which the estimated value calculated in the estimated-value calculating process increases; and a second writing process in which the controller writes the estimated value calculated in the estimated-value calculating process, into the nonvolatile memory in a situation in which the estimated value calculated in the estimated-value calculating process decreases. The controller is configured to: execute the first writing process when at least a first time has elapsed after the estimated value is written in the nonvolatile memory; and execute the second writing process when at least a second time has elapsed after the estimated value is written in the nonvolatile memory. The first time is less than the second time.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Figure 1:
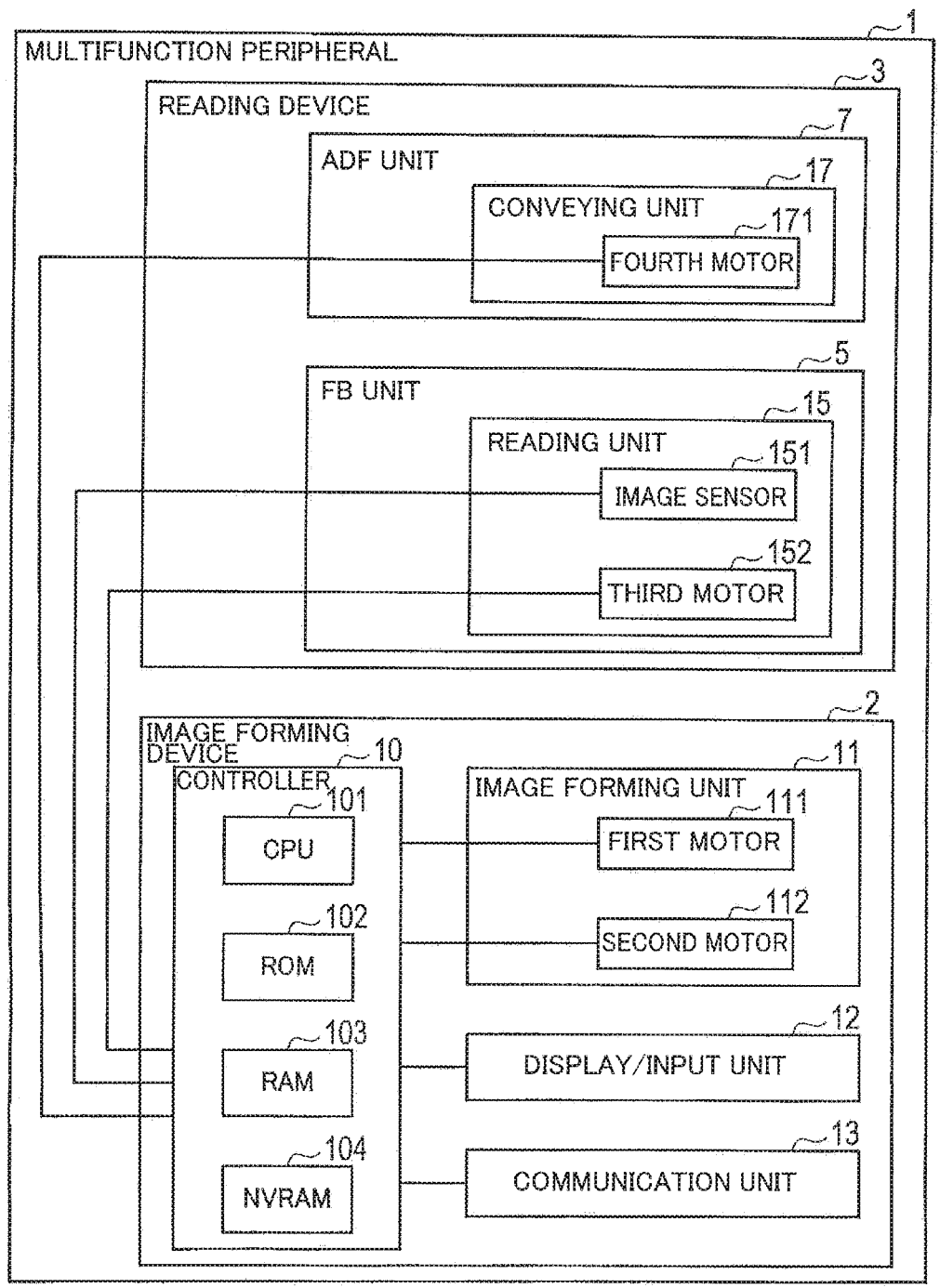
FIG. 1 is a block diagram illustrating an internal configuration of a multifunction peripheral.

Hereinafter, there will be described embodiments by reference to the drawings.
Configuration of MFP FIG. 1 illustrates a configuration of a multifunction peripheral (MFP) 1 according to one embodiment. The MFP 1 includes an image forming device 2 and a reading device 3 arranged above the image forming device 2. An opening (not illustrated) is provided on an upper surface of the image forming device 2. The reading device 3 is movable between a closed position for closing the opening of the image forming device 2 and an open position for exposing the opening. When the reading device 3 is moved to the open position, it is possible to perform maintenance and the like of components in the image forming device 2.

The reading device 3 includes a flat-bed (FB) unit 5 and an automatic document feeder (ADF) unit 7 disposed above the FB unit 5. A platen (not illustrated) is a transparent plate (e.g., a glass plate or an acrylic resin plate) provided on an upper surface of the FB unit 5. The ADF unit 7 is movable between a first position for covering the platen and a second position for exposing the platen to the outside. When the ADF unit 7 is moved to the second position, a document having an image to be read thereon can be placed on the platen or removed from an upper surface of the platen. When the ADF unit 7 is moved to the first position, the ADF unit 7 functions as a document cover that presses the document placed on the platen.

The image forming device 2 includes a controller 10, an image forming unit 11, a display/input unit 12, and a communication unit 13. The controller 10 includes known components including a CPU 101, a ROM 102, a RAM 103, and an NVRAM 104. To control the devices of the MFP 1, the CPU 101 executes predetermined processes according to control programs stored in the ROM 102 and the RAM 103. The RAM 103 stores data that are not problematic even in the case of being lost when the MFP 1 is powered off. One example of the data stored in the RAM 103 is data to be temporarily used by the CPU 101 during execution of the processes. The NVRAM 104 stores data required to be kept stored even in a case where the MFP 1 is powered off. Examples of the data stored in the NVRAM 104 include data necessary for managing the MFP 1 and setting data changeable by the user as needed.

The image forming unit 11 includes a first motor 111 and a second motor 112. In the present embodiment, the image forming unit 11 is configured to form an image on a recording medium such as a cut sheet by an inkjet method. However, the image forming unit 11 may be configured to form an image by a known recording method (e.g., an electrophotographic method) other than the inkjet method. The first motor 111 is a driving source for reciprocating a first carriage (not illustrated) on which a recording head (not illustrated) is mounted. The second motor 112 is a driving source for driving a conveyance mechanism (not illustrated) for conveying the recording medium.

The display/input unit 12 includes a liquid crystal display and a touch screen. Information on the MFP 1 is displayed on the liquid crystal display. Images representing buttons and the like necessary for operation on the touch screen are displayed on the liquid crystal display, and a touch operation performed on such an image is detectable by a transparent touch screen placed so as to overlap the liquid crystal display. The communication unit 13 includes: a communication interface for a wireless LAN; and a communication interface for a wired LAN.

The FB unit 5 is provided with a reading unit 15. The reading unit 15 includes an image sensor 151 and a third motor 152. The image sensor 151 is a one-dimensional image sensor having a plurality of reading elements arranged in one direction. In the present embodiment, a contact image sensor (CIS) is adopted as the image sensor 151. The third motor 152 is a driving source for reciprocating a second carriage (not illustrated) on which the image sensor 151 is mounted. The image sensor 151 is mounted on the second carriage, with the reading elements facing the platen. The second carriage reciprocates along one surface of the platen. The moving direction of the second carriage is a direction (a sub-scanning direction) perpendicular to the direction (a main-scanning direction) in which the reading elements of the image sensor 151 are arranged.

The ADF unit 7 is provided with a conveying unit 17 as one example of a conveyor. The conveying unit 17 includes a fourth motor 171. The conveying unit 17 includes various rollers included in a known ADF, such as a supply roller, a separation roller, a conveying roller, and a discharge roller). The rollers convey a sheet along a predetermined conveyance path. The fourth motor 171 is a driving source for rotationally driving the rollers.

In the case of reading an image of a to-be-read object supported by the platen provided on the upper surface of the FB unit 5, the image sensor 151 is reciprocated in the sub-scanning direction together with the second carriage to read the image of the to-be-read object through the transparent platen during the forward movement, for example.

In the case of reading the image of the sheet conveyed by the conveying unit 17, the image sensor 151 stops at a predetermined reading position. A platen for the ADF is disposed above the image sensor 151 stopping at the reading position. The sheet conveyed by the conveying unit 17 is conveyed along the conveyance path while being in contact with the upper surface of the platen for the ADF. The image sensor 151 reads the image of the sheet conveyed by the conveying unit 17 through the ADF platen.

Figure 2:
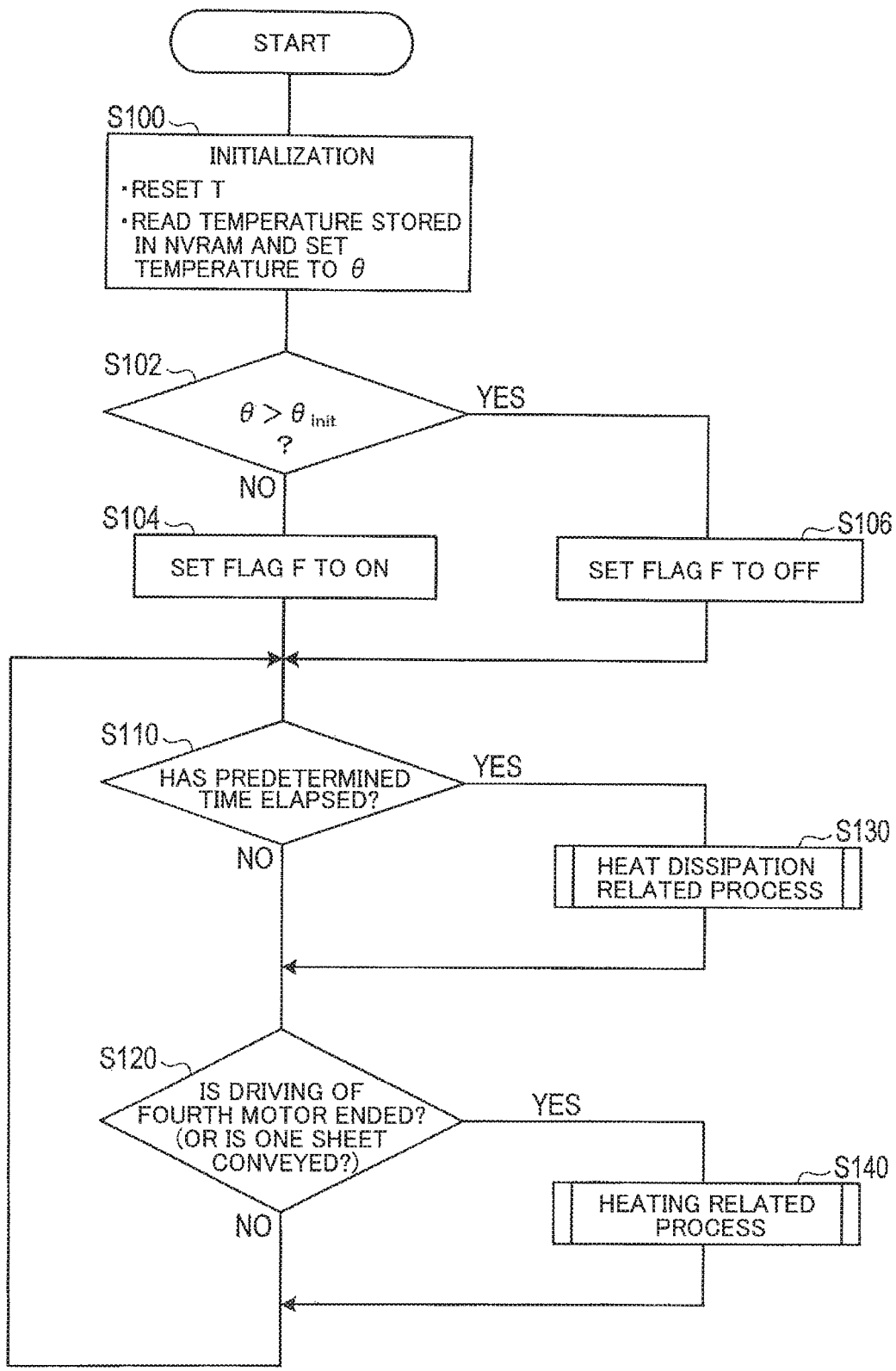
FIG. 2 is a flowchart of a temperature control process.

In addition to the configuration illustrated in FIG. 1, the MFP 1 has a configuration for input to the controller 10 and a configuration for output from the controller 10. However, since these configurations are well known and are not related to the main content of the present disclosure, description of the configurations is dispensed with.
Temperature Control Process Next, a temperature control process for the fourth motor 171 executed in the MFP 1 will be described with reference to FIGS. 2, 3, and 4. The temperature control process is started when a power switch (not illustrated) of the MFP 1 is turned on, and the temperature control process is thereafter repeatedly executed until the power switch is turned off.

Upon starting the temperature control process, the CPU 101 initializes variables to be used in steps described later (S100). More specifically, the CPU 101 resets an elapsed time T (variable) after saving of an estimated temperature (that is, sets zero as the elapsed time T after the saving of the estimated temperature). The CPU 101 reads the temperature saved in the NVRAM 104 and sets it as an estimated temperature θ (variable, which is an example of an estimated value). The temperature saved in the NVRAM 104 is a temperature saved in a step described later, and the temperature lastly saved in the NVRAM 104 during execution of the previous temperature control process is read out from the NVRAM 104 during execution of the current temperature control process.

Subsequently, the CPU 101 determines whether the estimated temperature θ is higher than an initial temperature θinit (constant, which is zero in the present embodiment) (S102). When the estimated temperature θ has sufficiently decreased during execution of the previous temperature control process, the initial temperature θinit is saved in the NVRAM 104 as the estimated temperature θ. On the other hand, for example, in a case where unexpected power failure or the like occurs in a state in which the estimated temperature θ has not sufficiently decreased during execution of the previous temperature control process, and the current temperature control process is thereafter executed subsequently, a temperature higher than the initial temperature θinit is in some cases saved in the NVRAM 104 as the estimated temperature θ.

Therefore, when the estimated temperature θ is not higher than the initial temperature θinit in S102 (S102: NO), the CPU 101 sets an initial temperature saved flag F (variable) to ON (S104). When the estimated temperature θ is higher than the initial temperature θinit in S102 (S102: YES), the CPU 101 sets the initial temperature saved flag F to OFF (S106). The initial temperature saved flag F is a flag which is set to ON when the initial temperature θinit is saved in the NVRAM 104. As will be described later in detail, in the present embodiment, the flag is set to OFF in S260 described later, set to OFF in S350 described later, and set to ON in S290 described later.

Subsequently, the CPU 101 determines whether a predetermined time has elapsed (S110). In the present embodiment, the predetermined time is set to one second. When the CPU 101 in S110 determines that the predetermined time has not elapsed (S110: NO), the CPU 101 determines whether the driving of the fourth motor 171 is ended (S120). Alternatively, as another embodiment, the CPU 101 may in S120 determine whether the conveying unit 17 completes conveyance of a particular number of sheets. That is, determination indicated in parentheses in S120 in FIG. 2 may be performed.

One of these determination conditions may be selected in consideration of specifications of the apparatus. For example, in a model configured to stop driving the fourth motor 171 after the sheet is conveyed, it may be determined in S120 that the driving of the fourth motor 171 is ended. Alternatively, for example, in a model configured to convey the next sheet without ending the driving of the fourth motor 171 after the sheet is conveyed in order to increase the sheet conveying speed, the completion of conveyance of a particular number of sheets may be determined in S120 without determining whether driving of the fourth motor 171 is ended.

For simplicity, the following description will be provided assuming that the CPU 101 in S120 determines whether the driving of the fourth motor 171 is ended in the present embodiment. When S120 is executed after the sheet conveying in the ADF unit 7 is ended, an affirmative determination is made in S120. When S120 is executed in a period starting from a time when an affirmative determination is made in S120 and ending at a time when the conveying of the next sheet is finished, a negative determination is made in S120.

When a negative determination is made in S120 (S120: NO), the process returns to S110. The CPU 101 repeatedly executes the determination of S110-S120. When the CPU 101 determines in S110 that the predetermined time has elapsed (S110: YES) during the steps repeatedly executed, the CPU 101 executes a heat dissipation related process (S130) described later. When the CPU 101 determines in S120 that the driving of the fourth motor 171 is ended (S120: YES), the CPU 101 executes a heating related process (S140) described later.

Heat Dissipation Related Process

Figure 3:
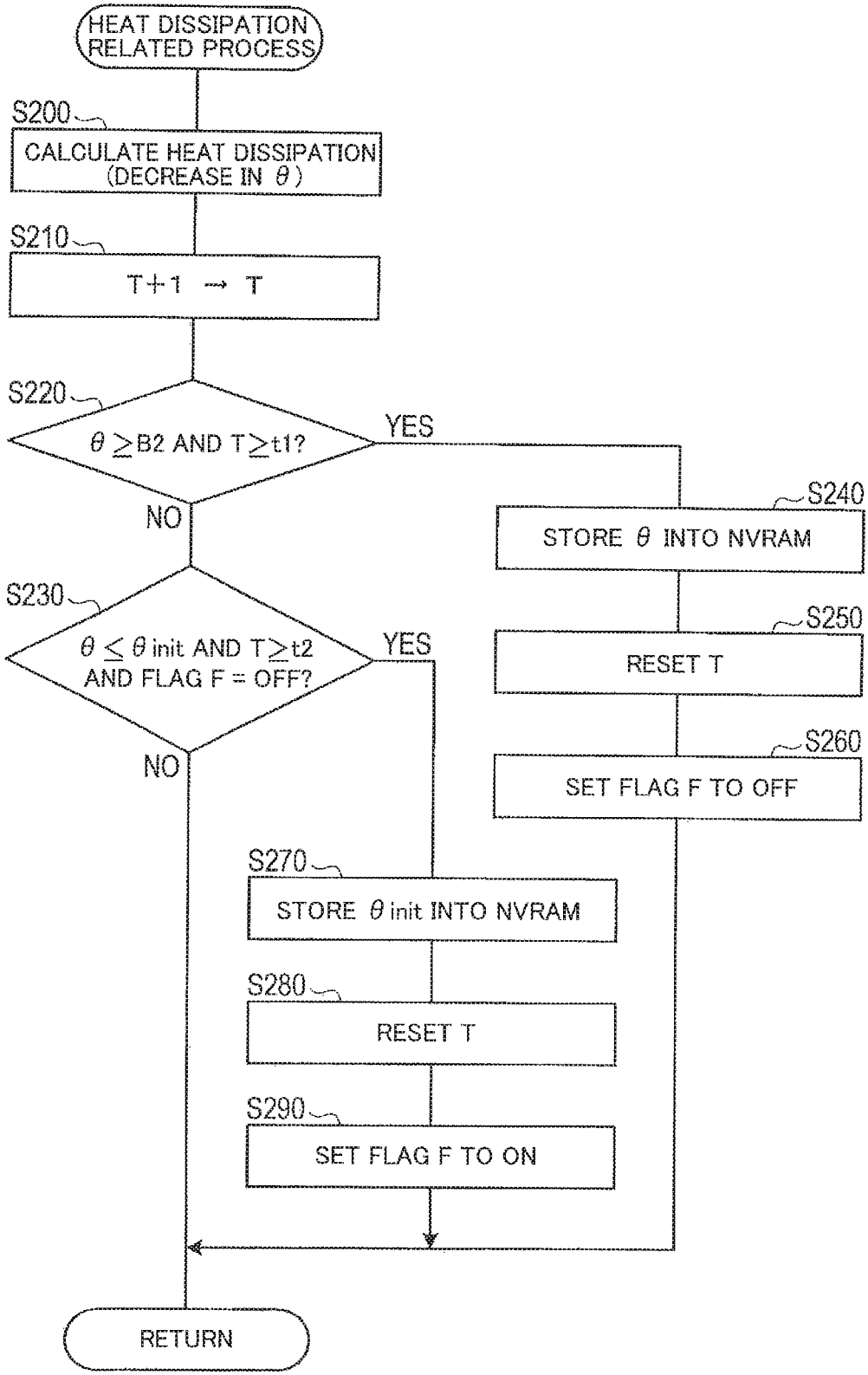
FIG. 3 is a flowchart of a heat dissipation related process.

FIG. 3 illustrates the heat dissipation related process in S130 by way of example. When the heat dissipation related process is started, the CPU 101 executes heat dissipation calculation (S200). In S200, the CPU 101, based on the heat dissipation characteristic of the fourth motor 171 measured in an actual motor, estimates the temperature change amount of the fourth motor 171 in a case where the above-mentioned predetermined time (one second in the present embodiment) has elapsed, and the CPU 101 subtracts the value corresponding to the temperature change amount from the value of the estimated temperature θ. In the present embodiment, step S200 is executed once per second substantially. The value corresponding to the temperature change amount of the fourth motor 171 is subtracted from the value of the estimated temperature θ each time when S200 is executed, and thus the value of the estimated temperature θ decreases.

Subsequently, the CPU 101 adds one second to the elapsed time T after saving of the estimated temperature θ (S210) and determines whether the following condition is satisfied (S220): the estimated temperature θ is greater than or equal to a second threshold value B2, and the elapsed time T after saving of the estimated temperature θ is longer than or equal to a time t1 (which is 10 minutes in the present embodiment). When a negative determination is made in S220 (S220: NO), the CPU determines whether the following condition is satisfied (S230): the estimated temperature θ is less than or equal to the initial temperature θinit, the elapsed time T after saving of the estimated temperature θ is longer than or equal to a time t2 (which is 15 minutes in the present embodiment), and the initial temperature saved flag F is OFF.

Steps S220 and S230 are for determining whether the timing of data writing into the NVRAM 104 has arrived under the condition that the subtraction is made for the estimated temperature θ. When an affirmative determination is made in S220 (S220: YES), it means that the timing for saving the estimated temperature θ into the NVRAM 104 has arrived. Conditions of this affirmative determination include that the estimated temperature θ is greater than or equal to the second threshold value B2 and the timing of the writing is a timing at which the elapsed time T after saving of the estimated temperature θ is longer than or equal to the time t1.

When an affirmative determination is made in S220, the CPU 101 saves the estimated temperature θ into the NVRAM 104 (S240), resets the elapsed time T after saving of the estimated temperature θ (S250), and sets the initial temperature saved flag F to OFF (S260). Upon completion of S260, the process illustrated in FIG. 3 is ended, and the process proceeds to S120 illustrated in FIG. 2.

On the other hand, when an affirmative determination is made in S230 (S230: YES), it means that the timing for saving the initial temperature θinit into the NVRAM 104 has arrived. Conditions of this affirmative determination include that the estimated temperature θ is lower than or equal to the initial temperature θinit and the timing of the writing is a timing at which the elapsed time T after saving of the estimated temperature θ is longer than or equal to the time t2. In S230, the state in which the initial temperature saved flag F is OFF is also one of the conditions of this affirmative determination. Thus, even when the estimated temperature θ is lower than or equal to the initial temperature θinit, and the elapsed time T after saving of the estimated temperature θ is longer than or equal to the time t2, a step (S270 described later) of saving the initial temperature θinit into the NVRAM 104 is executed only once until the initial temperature saved flag F is set to ON.

When an affirmative determination is made in S230, the CPU 101 saves the initial temperature θinit into the NVRAM 104 (S270), resets the elapsed time T after saving of the estimated temperature θ (S280), and sets the initial temperature saved flag F to ON (S290). When S290 is ended, the process illustrated in FIG. 3 is ended, and the process proceeds to S120 illustrated in FIG. 2.

When a negative determination is made in both S220 and S230 (S220: NO, S230: NO), it means that the timing is not a timing of data writing into the NVRAM 104. A temperature condition of conditions of this negative determination is that the estimated temperature θ is greater than the initial temperature θinit and less than the second threshold value B2. That is, in the temperature condition, writing of data into the NVRAM 104 is restricted during a period when the estimated temperature θ is greater than the initial temperature θinit and less than the second threshold value B2. The conditions of the negative determination in S220 and S230 include a time condition in addition to the temperature condition. That is, when the predetermined time t1 or t2 has not elapsed, writing of data into the NVRAM 104 is restricted. When a negative determination is made in both S220 and S230, the process illustrated in FIG. 3 is ended, and the process proceeds to S120 illustrated in FIG. 2.

Heating Related Process

Figure 4:
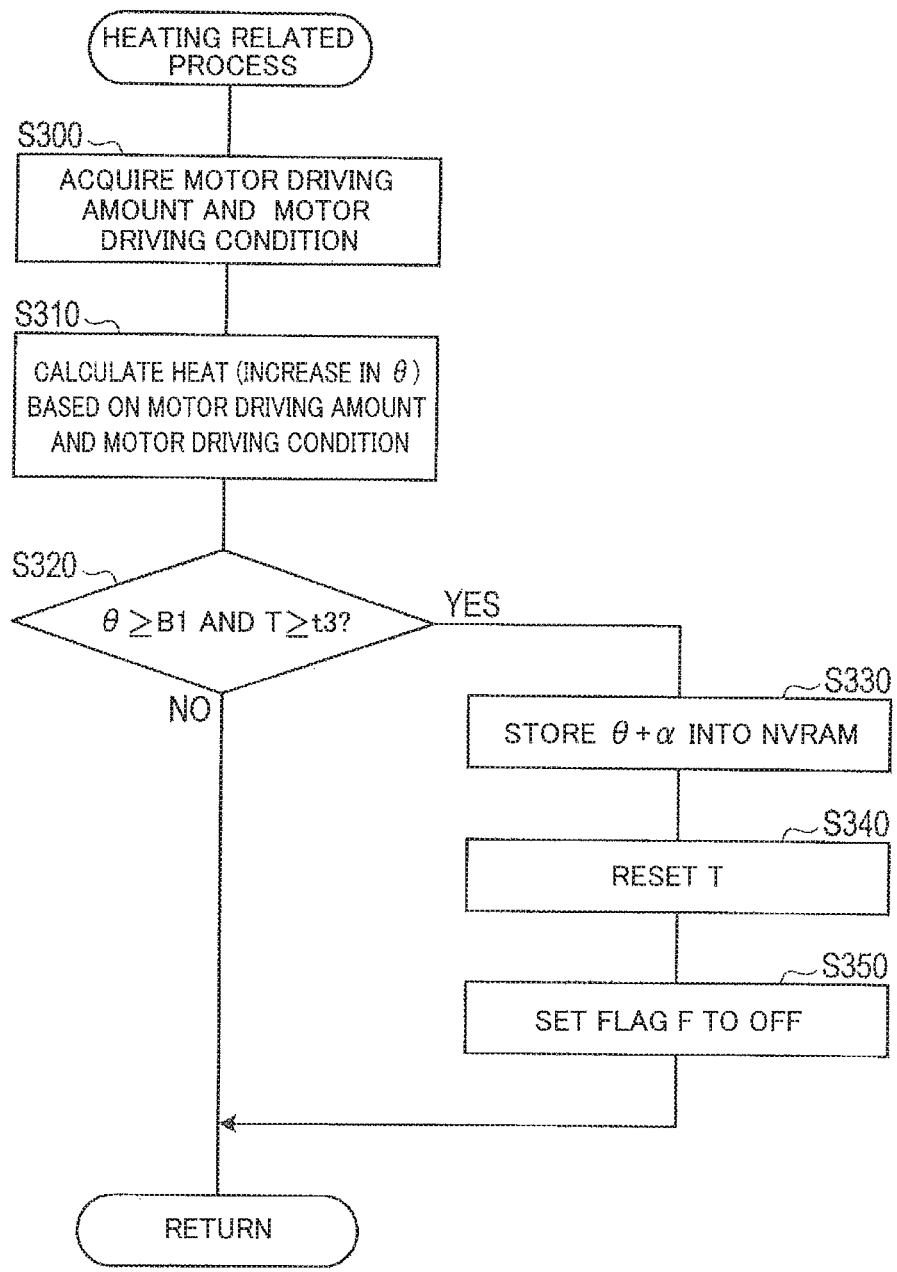
FIG. 4 is a flowchart of a heating related process.

FIG. 4 illustrates the heating related process of S140 by way of example. When the heating related process is started, the CPU 101 acquires an amount of driving of the fourth motor 171 (a motor driving amount of the fourth motor 171) and acquires a motor driving condition (S300). The CPU 101 then executes heating calculation based on the motor driving amount and the motor driving condition (S310). In S310, based on the characteristics of the fourth motor 171 measured in an actual motor, the CPU 101 estimates the temperature change amount of the fourth motor 171 in a case where the fourth motor 171 is driven by a predetermined driving amount under the predetermined driving condition, and then the CPU 101 adds the temperature change amount to the estimated temperature θ. As a result, the value of the estimated temperature θ increases.

Subsequently, the CPU 101 determines whether the following condition is satisfied (S320): the estimated temperature θ is greater than or equal to a first threshold value B1, and the elapsed time T after saving of estimated temperature θ is greater than or equal to a time t3 (which is one minute in the present embodiment). S320 is a step of determining whether the timing for saving the estimated temperature θ into the NVRAM 104 has arrived under the condition that the addition is made for the estimated temperature θ.

When an affirmative determination is made in S320 (S320: YES), it means that the timing of data writing into the NVRAM 104 has arrived. Conditions of this affirmative determination includes that the estimated temperature θ is greater than or equal to the first threshold value B1 and the timing of the writing is a timing at which the elapsed time T after saving of the estimated temperature θ is longer than or equal to the time t3. The time t3 is set to be shorter than the time t1. As a result, under the situation in which the addition is made for the estimated temperature θ, the frequency of writing into the NVRAM 104 is higher than that under the situation of subtraction.

When an affirmative determination is made in S320 (S320: YES), the CPU 101 saves, into the NVRAM 104, a value obtained by adding an increment value α to the estimated temperature θ (S330), resets the elapsed time T after saving of the estimated temperature θ (S340), and sets the initial temperature saved flag F to OFF (S350). Upon completion of S350, the process illustrated in FIG. 4 is ended, and the process returns to S110 illustrated in FIG. 2. When a negative determination is made in S320 (S320: NO), the CPU 101 determines that the timing is not a timing to write data into the NVRAM 104. In this case, the process illustrated in FIG. 4 is ended, and the process returns to S110 illustrated in FIG. 2.

Effects

In the MFP 1 as described above, in the situation in which the estimated temperature θ increases, the frequency of writing the estimated temperature θ into the NVRAM 104 is higher than that in the situation in which the estimated temperature θ decreases. Therefore, in the situation in which the estimated temperature θ increases, it is possible to increase the possibility that the latest estimated temperature θ is stored in the NVRAM 104. Therefore, in the situation in which the estimated temperature θ increases, for example, even if the MFP 1 is suddenly powered off, it is possible to prevent an occurrence of a situation in which the estimated temperature θ stored in the NVRAM 104 is excessively lower than the actual temperature of the fourth motor 171. Also, in the situation in which the estimated temperature θ decreases, the frequency of writing the estimated temperature θ into the NVRAM 104 is lower than that in the situation in which the estimated temperature θ increases. Therefore, it is possible to reduce the need to increase in the number of rewritings in the NVRAM 104 to prolong the lifetime of the NVRAM 104 having an upper limit of the number of rewritings. Furthermore, the frequency of writing the estimated temperature θ into the NVRAM 104 does not vary with an amount of change in the estimated temperature θ. Thus, even in a case where the estimated temperature θ greatly increases and decreases many times in a short time, the writing into the NVRAM 104 does not occur frequently, thereby prolonging the lifetime of the NVRAM 104.

In the present embodiment, the cycle of writing the estimated temperature θ into the NVRAM 104 is made shorter in the situation in which the estimated temperature θ increases. Therefore, it is possible to increase the possibility that the latest estimated temperature θ is stored in the NVRAM 104. Conversely, the cycle of writing the estimated temperature θ in the NVRAM 104 is made longer in the situation in which the estimated temperature θ decreases. Therefore, it is possible to reduce the need to increase in the number of rewritings in the NVRAM 104, thereby prolonging the lifetime of the NVRAM 104 having an upper limit of the number of rewritings.

In the present embodiment, the controller 10 is configured to write the estimated temperature θ into the NVRAM 104 in steps S320 to S350 (which are an example of a first writing process) when the estimated temperature θ calculated in steps S200 and S310 (which are an example of an estimated-value calculating process) is greater than the first threshold value B1. Also, the controller 10 is configured to write the estimated temperature θ into the NVRAM 104 in steps S220 and S240 to S260 (which are an example of the second writing process) when the estimated temperature θ calculated at steps S200 and S310 is greater than the second threshold value B2. The first threshold value B1 is less than the second threshold value B2.

Therefore, in the situation in which the estimated temperature θ gradually increases, when the estimated temperature θ exceeds the first threshold value B1 that is less than the second threshold value B2, the process of writing the estimated temperature θ into the NVRAM 104 is started. Since the estimated temperature θ is written into the NVRAM 104 early in the situation in which the estimated temperature θ gradually increases, it is possible to appropriately start the temperature control of the fourth motor 171 from the time when the temperature of the fourth motor 171 is sufficiently low. On the other hand, in the situation in which the estimated temperature θ gradually decreases, even in the case where the estimated temperature θ is greater than the first threshold value B1, when the estimated temperature θ is lower than the second threshold value B2 that is higher than the first threshold temperature B1, the process of writing the estimated temperature θ into the NVRAM 104 is not executed. This configuration reduces the need to increase in the number of rewritings in the NVRAM 104, thereby prolonging the lifetime of the NVRAM 104 having an upper limit of the number of rewritings.

In the present embodiment, when the estimated temperature θ is less than or equal to the initial temperature θinit (an example of a third threshold value) which is a value less than or equal to the first threshold value B1, the initial temperature θinit is written into the NVRAM 104. Thus, in the situation in which the estimated temperature θ decreases, even in a case where the writing into the NVRAM 104 is no longer executed because the estimated temperature θ is less than or equal to the second threshold value B2, the initial temperature θinit is written into the NVRAM 104 when the estimated temperature θ has reached the initial temperature θinit. Therefore, the estimated temperature θ greater than the second threshold value B2 is not left without being updated. In the event of power failure after updating, the estimation of the temperature can be started from the initial temperature θinit, making it possible to prevent estimation of the temperature from starting from an unnecessarily high temperature.

In the present embodiment, in the situation in which the estimated temperature θ increases, the increment value α corresponding to the predetermined temperature is added to the estimated temperature θ, and the value obtained by this addition is written into the NVRAM 104. Thus, in the situation in which the estimated temperature θ increases, a relatively high estimated temperature θ is written into the NVRAM 104. Accordingly, it is possible to execute appropriate processes on the assumption that the temperature of the fourth motor 171 is relatively high.

Other Embodiments

While the embodiment has been described above, it is to be understood that the disclosure is not limited to the details of the illustrated embodiment, but may be embodied with various changes and modifications, which may occur to those skilled in the art, without departing from the spirit and scope of the disclosure.

For example, in the above-described embodiment, the temperature control is described by taking the fourth motor 171 provided in the ADF unit 7 as one example. However, the same temperature control process may be executed for the first motor 111, the second motor 112, and the third motor 152.

While the above-described embodiment illustrates two conditions for an affirmative determination in S120, an affirmative determination may be made in S120 when a condition or conditions other than the two conditions are satisfied. For example, an affirmative determination may be made during conveyance of one sheet, or when the fourth motor 171 is driven by a predetermined driving amount or more. Alternatively, an affirmative determination may be made in S120 in a case where the recording head provided in the image forming unit completes a predetermined number of reciprocations (e.g., two reciprocations) as long as this movement is accompanied with the operation of the image forming unit, or an affirmative determination may be made in S120 under a condition other than the above-described condition.

A function realized by one component in each of the above-described embodiments may be achieved by a plurality of components. A function achieved by a plurality of components may be achieved by one component. Some of the configurations in the above-described embodiments may be omitted. At least a portion of the configuration in each of the above-described embodiments may be added to or replaced with the configurations in the other embodiment described above. All the aspects included in the technical spirit specified from the disclosure of the claims correspond to embodiments of the present disclosure.

As is apparent from the above-described embodiments, the electronic apparatus and the sheet conveying apparatus according to the present disclosure may further have the following configurations.

The electronic apparatus or the sheet conveying apparatus according to the present disclosure may be configured such that the controller is configured such that a cycle of writing the estimated value into the nonvolatile memory in the first writing process is less than a cycle of writing the estimated value in the nonvolatile memory in the second writing process.

According to the electronic apparatus or the sheet conveying apparatus configured as described above, in the situation in which the estimated value increases, the cycle of writing the estimated value into the nonvolatile memory is made short. This increases the possibility that the latest estimated value is stored in the nonvolatile memory. In the situation in which the estimated value decreases, the cycle of writing the estimated value into the nonvolatile memory is made long. This reduces the need to increase in the number of rewritings in the nonvolatile memory, thereby prolonging the lifetime of the nonvolatile memory having an upper limit of the number of rewritings.

The electronic apparatus or the sheet conveying apparatus according to the present disclosure may be configured such that the controller is configured to: write the estimated value into the nonvolatile memory in the first writing process when the estimated value calculated in the estimated-value calculating process is greater than a first threshold value; and write the estimated value into the nonvolatile memory in the second writing process when the estimated value calculated in the estimated-value calculating process is greater than a second threshold value, and such that the first threshold value is less than the second threshold value in temperature.

According to the electronic apparatus or the sheet conveying apparatus configured as described above, in the situation in which the estimated value gradually increases, when the estimated value exceeds the first threshold that which is less than the second threshold value, the process of writing the estimated value into the nonvolatile memory is started. Therefore, since the estimated value is written into the nonvolatile memory early in the situation in which the estimated value gradually increases, it is possible to appropriately start the temperature control of the motor from the time when the motor temperature is sufficiently low. On the other hand, in the situation in which the estimated value gradually decreases, even in the case where the estimated value exceeds the first threshold value, when the estimated value is lower than the second threshold value that is higher than the first threshold temperature, the process of writing the estimated value into the nonvolatile memory is not executed. This configuration reduces the need to increase in the number of rewritings in the nonvolatile memory, thereby prolonging the lifetime of the nonvolatile memory having an upper limit of the number of rewritings.

The controller of the electronic apparatus or the sheet conveying apparatus according to the present disclosure may be configured to execute a third writing process in which the controller writes a third threshold value as the estimated value into the nonvolatile memory when the estimated value is less than or equal to the third threshold value in the situation in which the estimated value calculated in the estimated-value calculating process decreases, and such that the third threshold value is less than or equal to the first threshold value.

According to the electronic apparatus or the sheet conveying apparatus configured as described above, when the estimated value is lower than or equal to the third threshold value that is less than or equal to the first threshold value, the third threshold value is written into the nonvolatile memory as an estimated value. Therefore, in the situation in which the estimated value decreases, even in a case where the writing into the nonvolatile memory is no longer executed because the estimated value is less than or equal to the second threshold value, when the estimated value has reached the third threshold value, the third threshold value is written into the nonvolatile memory. Therefore, the estimated value greater than the second threshold value is not left without being updated. In the event of power failure after updating, the estimation of the temperature can be started from the third threshold value, making it possible to prevent estimation of the temperature from starting from an unnecessarily high temperature (i.e., an estimated value greater than the second threshold value B2).

The controller of the electronic apparatus or the sheet conveying apparatus according to the present disclosure may be configured to, in the first writing process, add an increment value corresponding to a particular temperature, to the estimated value calculated in the estimated-value calculating process, and write a value obtained by adding the increment value to the estimated value, into the nonvolatile memory.

According to the electronic apparatus or the sheet conveying apparatus configured as described above, in the situation in which the estimated value increases, the increment value corresponding to the predetermined temperature is added to the estimated value, and a value obtained by this addition is written into the nonvolatile memory. Thus, in the situation in which the estimated value increases, a relatively high estimated value is written into the nonvolatile memory. Accordingly, it is possible to execute appropriate processes on the assumption that the temperature of the motor is relatively high.

The controller of the electronic apparatus or the sheet conveying apparatus according to the present disclosure may be configured to increase the estimated value based on the driving amount and the driving condition of the motor in the estimated-value calculating process when driving of the motor is ended.

According to the electronic apparatus or the sheet conveying apparatus configured as described above, the estimated value increases in synchronization with the end of driving of the motor. This configuration reduces a load on the controller when compared with a configuration in which the estimated value increases during the driving of the motor. Also, when compared with a configuration in which the estimated value is not immediately calculated after the end of driving of the motor, it is possible to calculate the estimated value with consideration of the situation immediately after the end of driving.

The controller of electronic apparatus or the sheet conveying apparatus according to the present disclosure may be configured to increase the estimated value based on the driving amount and the driving condition of the motor in the estimated-value calculating process when conveyance of a particular number of sheets by the conveyor is completed.

According to the electronic apparatus or the sheet conveying apparatus configured as described above, the estimated value increases in synchronization with the completion of conveyance of a particular number of sheets (e.g., one sheet). Therefore, when compared with a configuration in which the estimated value is not immediately calculated after the completion of conveyance of a particular number of sheets, it is possible to calculate the estimated value with consideration of the situation immediately after the completion of conveyance of the particular number of sheets.

What is claimed is:

1. An electronic apparatus, comprising:
   a motor;
   a controller configured to control the motor; and
   a nonvolatile memory configured to store data to be read and written by the controller,
   wherein the controller is configured to execute:
      an estimated-value calculating process in which the controller calculates an estimated value of a temperature of the motor, such that the estimated value increases based on a driving amount and a driving condition of the motor, and decreases with a lapse of time;
      a first writing process in which the controller writes the estimated value calculated in the estimated-value calculating process, into the nonvolatile memory in a situation in which the estimated value calculated in the estimated-value calculating process increases; and
      a second writing process in which the controller writes the estimated value calculated in the estimated-value calculating process, into the nonvolatile memory in a situation in which the estimated value calculated in the estimated-value calculating process decreases, and wherein the controller is configured to:
write the estimated value into the nonvolatile memory in the first writing process when at least a first elapsed time has elapsed since the estimated value was previously written in the nonvolatile memory; and
write the estimated value into the nonvolatile memory in the second writing process when at least a second elapsed time that is greater than the first elapsed time has elapsed since the estimated value was previously written in the nonvolatile memory.

2. The electronic apparatus according to claim 1, wherein the controller is configured such that a cycle of writing the estimated value into the nonvolatile memory in the first writing process is less than a cycle of writing the estimated value in the nonvolatile memory in the second writing process.

3. The electronic apparatus according to claim 1, wherein the controller is configured to:
write the estimated value into the nonvolatile memory in the first writing process when the estimated value calculated in the estimated-value calculating process is greater than a first threshold value; and
write the estimated value into the nonvolatile memory in the second writing process when the estimated value calculated in the estimated-value calculating process is greater than a second threshold value, and
wherein the first threshold value is less than the second threshold value.

4. The electronic apparatus according to claim 3, wherein the controller is configured to execute a third writing process in which the controller writes a third threshold value as the estimated value into the nonvolatile memory when the estimated value is less than or equal to the third threshold value in the situation in which the estimated value calculated in the estimated-value calculating process decreases, and
wherein the third threshold value is less than or equal to the first threshold value.

5. The electronic apparatus according to claim 1, wherein the controller is configured to, in the first writing process, add an increment value corresponding to a particular temperature, to the estimated value calculated in the estimated-value calculating process, and write a value obtained by adding the increment value to the estimated value, into the nonvolatile memory.

6. The electronic apparatus according to claim 1, wherein the controller is configured to increase the estimated value based on the driving amount and the driving condition of the motor in the estimated-value calculating process when driving of the motor is ended.

7. A nontransitory storage medium storing a program readable by a computer of an electronic apparatus,
wherein the electronic apparatus includes a motor and a nonvolatile memory configured to store data to be read and written,
wherein, when executed by the computer, the program causes the electronic apparatus to execute:
an estimated-value calculating process in which the electronic apparatus calculates an estimated value of a temperature of the motor, such that the estimated value increases based on a driving amount and a driving condition of the motor, and decreases with a lapse of time;
a first writing process in which the electronic apparatus writes the estimated value calculated in the estimated-value calculating process, into the nonvolatile memory in a situation in which the estimated value calculated in the estimated-value calculating process increases; and
a second writing process in which the electronic apparatus writes the estimated value calculated in the estimated-value calculating process, into the nonvolatile memory in a situation in which the estimated value calculated in the estimated-value calculating process decreases,
wherein the estimated value is written in the nonvolatile memory in the first writing process when at least a first elapsed time has elapsed since the estimated value was previously written in the nonvolatile memory, and
wherein the estimated value is written in the nonvolatile memory in the second writing process when at least a second elapsed time that is greater than the first elapsed time has elapsed since the estimated value was previously written in the nonvolatile memory.

8. A sheet conveying apparatus, comprising:
a motor:
a conveyor configured to be driven by the motor and convey a sheet along a particular conveyance path;
a controller configured to control the motor; and
a nonvolatile memory configured to store data to be read and written by the controller,
wherein the controller is configured to execute:
an estimated-value calculating process in which the controller calculates an estimated value of a temperature of the motor, such that the estimated value increases based on a driving amount and a driving condition of the motor, and decreases with a lapse of time;
a first writing process in which the controller writes the estimated value calculated in the estimated-value calculating process, into the nonvolatile memory in a situation in which the estimated value calculated in the estimated-value calculating process increases; and
a second writing process in which the controller writes the estimated value calculated in the estimated-value calculating process, into the nonvolatile memory in a situation in which the estimated value calculated in the estimated-value calculating process decreases, and
wherein the controller is configured to:
write the estimated value into the nonvolatile memory in the first writing process when at least a first elapsed time has elapsed since the estimated value was previously written in the nonvolatile memory; and
write the estimated value into the nonvolatile memory in the second writing process when at least a second elapsed time that is greater than the first elapsed time has elapsed since the estimated value was previously written in the nonvolatile memory.

9. The sheet conveying apparatus according to claim 8, wherein the controller is configured such that a cycle of writing the estimated value into the nonvolatile memory in the first writing process is less than a cycle of writing the estimated value in the nonvolatile memory in the second writing process.

10. The sheet conveying apparatus according to claim 8, wherein the controller is configured to:
  write the estimated value into the nonvolatile memory in the first writing process when the estimated value calculated in the estimated-value calculating process is greater than a first threshold value; and
  write the estimated value into the nonvolatile memory in the second writing process when the estimated value calculated in the estimated-value calculating process is greater than a second threshold value, and
wherein the first threshold value is less than the second threshold value.

11. The sheet conveying apparatus according to claim 10, wherein the controller is configured to execute a third writing process in which the controller writes a third threshold value as the estimated value into the nonvolatile memory when the estimated value is less than or equal to the third threshold value in the situation in which the estimated value calculated in the estimated-value calculating process decreases, and
wherein the third threshold value is less than or equal to the first threshold value.

12. The sheet conveying apparatus according to claim 8, wherein the controller is configured to, in the first writing process, add an increment value corresponding to a particular temperature, to the estimated value calculated in the estimated-value calculating process, and write a value obtained by adding the increment value to the estimated value, into the nonvolatile memory.

13. The sheet conveying apparatus according to claim 8, wherein the controller is configured to increase the estimated value based on the driving amount and the driving condition of the motor in the estimated-value calculating process when driving of the motor is ended.

14. The sheet conveying apparatus according to claim 8, wherein the controller is configured to increase the estimated value based on the driving amount and the driving condition of the motor in the estimated-value calculating process when driving of the motor is ended.

15. The sheet conveying apparatus according to claim 8, wherein the controller is configured to increase the estimated value based on the driving amount and the driving condition of the motor in the estimated-value calculating process when conveyance of a particular number of sheets by the conveyor is completed.

\* \* \* \* \*